Jan. 20, 1925.
C. J. VITEK ET AL
1,523,919
ENGINEER'S DRAFTING SCALE
Filed Aug. 4, 1922
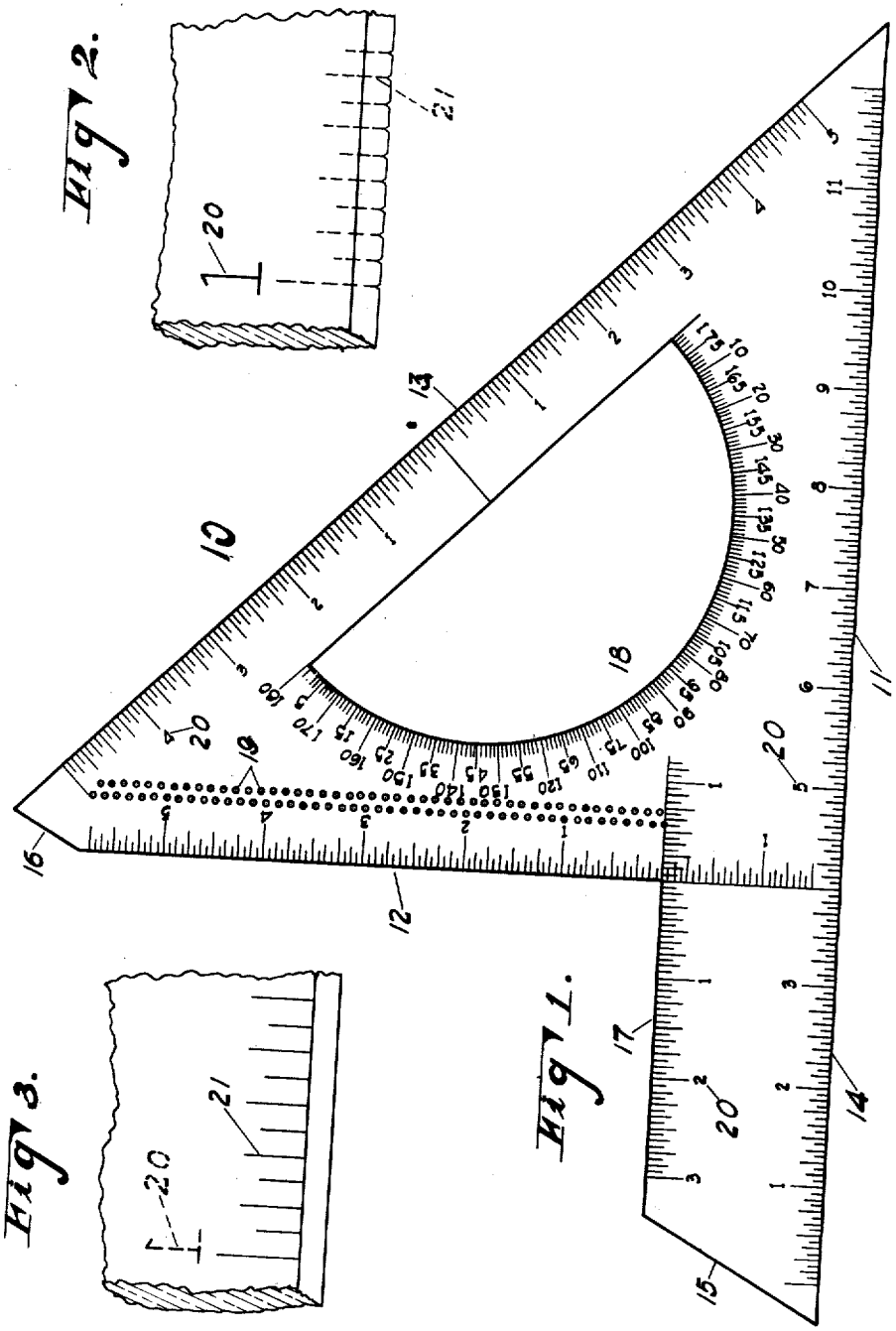
INVENTOR.
Charles J. Vitek,
BY Henry O. Schultz,
Roger J. Merriam,
Erwin, Cohnen & Woolard
ATTORNEYS.

Patented Jan. 20, 1925.

1,523,919

UNITED STATES PATENT OFFICE.

CHARLES J. VITEK AND HENRY O. SCHULTZ, OF MILWAUKEE, AND ROGER J. MERRIAM, OF COLUMBUS, WISCONSIN; SAID MERRIAM ASSIGNOR TO PETER J. DRIES, JR., OF MILWAUKEE, WISCONSIN.

ENGINEER'S DRAFTING SCALE.

Application filed August 4, 1922. Serial No. 579,743.

*To all whom it may concern:*

Be it known that we, CHARLES J. VITEK and HENRY O. SCHULTZ, residing in the city of Milwaukee and State of Wisconsin, and ROGER J. MERRIAM, residing in the city of Columbus, in the county of Columbia and State of Wisconsin, all citizens of the United States, have invented certain new and useful Improvements in Engineers' Drafting Scales; and we do declare the following to be a clear, exact, and complete description thereof, such as will enable persons skilled in the art to which the invention pertains to make and use the same, reference being had to the accompanying drawing for an exposition of a construction in which our invention has been embodied.

The invention relates to transparent scales formed and graduated to meet the requirements of engineering and other other draftsmen, and comprises an improved construction of such devices whereby the range of its possible uses is greatly enlarged, as will be specifically pointed out hereinafter.

The invention further comprises a transparent scale on which the graduations are placed upon the reverse side thereof so as to enable a more accurate registration and measurement to be obtained when the scale is laid upon the paper, it being possible by this means to determine exact proportions by bringing such graduations into registry with any marks already indicated upon the paper.

The novelty of the invention will be pointed out in the appended claim.

In the accompanying drawing:

Figure 1 is a plan view of our improved scale.

Figure 2 is a perspective view of a portion of the lower edge thereof, indicating the arrangement of the graduations as they appear upon the underside of the transparent scale.

Fig. 3 a perspective view, similar to Fig. 2, of the reverse side of the scale.

The improved transparent scale constructed in accordance with our invention is formed as a triangle 10, having a base 11, the side 12 at a right angle to the base 11, and the side 13, the latter forming an angle of 45° with the base 11 and side 12. The base 11 is extended so as to provide a scale 14 formed as a part of the base, the free end 15 of such extension being inclined at an angle of 30°, and the apex 16 of the triangle inclined at the corresponding side to present a base having a bearing of appreciable linear contact when used in certain relations. The scale may be employed for the production of angles of 15°, 30°, 45°, 60°, 75°, and 90°, as will be apparent from an inspection of its formation. The parallel edges of the extension 14 of the base 11, and the side 12, form a square having two ruling edges at a right angle to each other, the side 12 and the upper parallel edge 17 meeting in a common vertex.

A bevel protractor 18, the base of which extends in parallelism with the side 13, is formed in the triangle, and graduated upon its arcuate contour to permit the determination of any desired degree of inclination. The face of the scale is provided with linear measurement indications along the ruling edges, those leading from the common vertex extending oppositely therefrom in continuation of the indications along the edges.

The graduations forming the sub-divisions of the linear indications upon the face of the scale are placed upon the under side of the scale, so as to be discernible through the transparent material of which the scale is constituted. This feature of the construction enables the graduations to be brought into exact registry with positions already indicated upon the paper, and conduces to greater accuracy in arranging the scale with respect to such positions.

In line with the graduations which are made upon the edge 12, we provide a succession of perforations 19, the lower perforation being in the line of the common vertex, the purpose of this arrangement being to permit the scale to be employed in scribing circles, a fixed point being inserted through the said lower perforation, and constituting the axis of rotation of the scale, a marking point being passed into the desired perforation as indicated by the graduation pertaining thereto, to scribe the desired circle, when the scale is rotated upon the axis established by the fixed point.

In the drawing, the linear indications upon the face of the scale are indicated by the numeral 20, and the graduations upon the underside thereof by the numeral 21, it being understood that the latter are clearly discernible at all times through the transparent material of which the scale is formed. Fig. 2 exemplifies the transparent scale upon which the linear measurement indications 20 and the graduations 21 are shown in their relative positions.

Having thus described our invention, what we claim and desire to secure by Lettes Patent of the United States is:—

A transparent drafting scale formed as a right angle triangle with an extended base, the free end of the base and the apex of the triangle having a right line inclination to provide an extended linear bearing when the inclined end and apex are employed as a base for measurements by the scale, the scale being provided with suitable graduations upon the underside thereof and visible through the scale, and linear measurement indications upon the face of the scale.

In testimony whereof, we have signed our names at Waukesha, this 1st day of August, 1922.

CHAS. J. VITEK.
HENRY O. SCHULTZ.
ROGER J. MERRIAM.

Witnesses:
LIN LANTERS,
A. J. GETERSEN.

the underside thereof by the numeral 21, it being understood that the latter are clearly discernible at all times through the transparent material of which the scale is formed. Fig. 2 exemplifies the transparent scale upon which the linear measurement indications 20 and the graduations 21 are shown in their relative positions.

Having thus described our invention, what we claim and desire to secure by Lettes Patent of the United States is:—

A transparent drafting scale formed as a right angle triangle with an extended base, the free end of the base and the apex of the triangle having a right line inclination to provide an extended linear bearing when the inclined end and apex are employed as a base for measurements by the scale, the scale being provided with suitable graduations upon the underside thereof and visible through the scale, and linear measurement indications upon the face of the scale.

In testimony whereof, we have signed our names at Waukesha, this 1st day of August, 1922.

CHAS. J. VITEK.
HENRY O. SCHULTZ.
ROGER J. MERRIAM.

Witnesses:
LIN LANTERS,
A. J. GETERSEN.

Certificate of Correction.

It is hereby certified that in Letters Patent No. 1,523,919, granted January 20, 1925, upon the application of Charles J. Vitek and Henry O. Schultz, of Milwaukee, and Roger J. Merriam, of Columbus, Wisconsin, for an improvement in "Engineers' Drafting Scales," errors appear in the printed specification requiring correction as follows: Page 2, line 12, before the article "A" insert the numeral *1.;* same page, after line 23 insert the following as claim 2:

*2. A transparent drafting scale formed as a right angle triangle with an extended base, the free end of the base and the apex of the triangle having a right line inclination to provide an extended linear bearing when the inclined end and apex are employed as a base for measurements by the scale, the scale being provided with suitable graduations along the inner edge of the extended base and the adjacent edge of the triangle, such graduations having a common vertex and extending therefrom in continuation of the edge graduations.;* and that the said Letters Patent should be read with these corrections therein that the same may conform to the record of the case in the Patent Office.

Signed and sealed this 5th day of May, A. D. 1925.

[SEAL.]

KARL FENNING,
*Acting Commissioner of Patents.*

Certificate of Correction.

It is hereby certified that in Letters Patent No. 1,523,919, granted January 20, 1925, upon the application of Charles J. Vitek and Henry O. Schultz, of Milwaukee, and Roger J. Merriam, of Columbus, Wisconsin, for an improvement in "Engineers' Drafting Scales," errors appear in the printed specification requiring correction as follows: Page 2, line 12, before the article "A" insert the numeral *1.;* same page, after line 23 insert the following as claim 2:

*2. A transparent drafting scale formed as a right angle triangle with an extended base, the free end of the base and the apex of the triangle having a right line inclination to provide an extended linear bearing when the inclined end and apex are employed as a base for measurements by the scale, the scale being provided with suitable graduations along the inner edge of the extended base and the adjacent edge of the triangle, such graduations having a common vertex and extending therefrom in continuation of the edge graduations.;* and that the said Letters Patent should be read with these corrections therein that the same may conform to the record of the case in the Patent Office.

Signed and sealed this 5th day of May, A. D. 1925.

[SEAL.]

KARL FENNING,
*Acting Commissioner of Patents.*